(12) United States Patent  
Takechi

(10) Patent No.: US 10,624,327 B2  
(45) Date of Patent: Apr. 21, 2020

(54) DUAL-BEARING REEL

(71) Applicant: Shimano Inc., Sakai, Osaka (JP)

(72) Inventor: Kunio Takechi, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 3 days.

(21) Appl. No.: 16/113,771

(22) Filed: Aug. 27, 2018

(65) Prior Publication Data

US 2019/0090466 A1 Mar. 28, 2019

(30) Foreign Application Priority Data

Sep. 28, 2017 (JP) .................................. 2017-187742

(51) Int. Cl.
*A01K 89/01* (2006.01)
*A01K 89/015* (2006.01)

(52) U.S. Cl.
CPC .............................. *A01K 89/01917* (2015.05)

(58) Field of Classification Search
CPC ........ A01K 89/01912; A01K 89/01917; A01K 89/0193
See application file for complete search history.

(56) References Cited

U.S. PATENT DOCUMENTS

| 5,292,087 | A | * | 3/1994 | Sato | ................. | A01K 89/01555 |
| | | | | | | 242/268 |
| 5,921,490 | A | * | 7/1999 | Sato | ................... | A01K 89/0189 |
| | | | | | | 242/261 |
| 6,045,075 | A | * | 4/2000 | Iwabuchi | ......... | A01K 89/01917 |
| | | | | | | 242/279 |
| 6,189,823 | B1 | * | 2/2001 | Kobayashi | ....... | A01K 89/01921 |
| | | | | | | 242/312 |
| 6,409,113 | B1 | * | 6/2002 | Hirayama | ........ | A01K 89/01557 |
| | | | | | | 242/310 |
| 6,474,580 | B1 | * | 11/2002 | Hirayama | .......... | A01K 89/0155 |
| | | | | | | 242/289 |
| 2003/0111569 | A1 | * | 6/2003 | Hitomi | ........... | A01K 89/011223 |
| | | | | | | 242/321 |
| 2003/0209621 | A1 | * | 11/2003 | Maeda | .................... | A01K 89/00 |
| | | | | | | 242/321 |
| 2005/0056716 | A1 | * | 3/2005 | Kawasaki | .............. | A01K 89/00 |
| | | | | | | 242/310 |

(Continued)

FOREIGN PATENT DOCUMENTS

JP 2016-067283 A 5/2016

*Primary Examiner* — Emmanuel M Marcelo

(74) *Attorney, Agent, or Firm* — United IP Counselors, LLC

(57) ABSTRACT

A dual-bearing reel having a level winding mechanism includes a first main body that rotatably supports one end of a spool and rotates the spool, a second main body including a gear that rotates in conjunction with rotation of the spool, a worm shaft that has the gear attached thereto and rotates together with the gear, a level wind pipe through which the worm shaft passes, and a level winder. The level wind pipe has an outer diameter smaller than an outer diameter of the gear. The second main body includes a gear housing portion for housing the gear. The gear housing portion has an opening that is larger than the gear to allow the level wind pipe to enter the opening. The dual-bearing reel also has a gap filling portion that fills a gap between the level wind pipe and an inner wall surface of the opening.

6 Claims, 7 Drawing Sheets

(56) References Cited

U.S. PATENT DOCUMENTS

| | | | |
|---|---|---|---|
| 2012/0056028 A1* | 3/2012 | Kawasaki | A01K 89/006 242/267 |
| 2015/0115088 A1* | 4/2015 | Toma | A01K 89/01928 242/283 |
| 2015/0150229 A1* | 6/2015 | Umezawa | A01K 89/0117 242/258 |
| 2015/0189865 A1* | 7/2015 | Umezawa | A01K 89/015 242/236 |
| 2016/0262362 A1* | 9/2016 | Takechi | A01K 89/01 |

* cited by examiner

DUAL-BEARING REEL

CROSS-REFERENCE TO RELATED APPLICATIONS

This application claims priority to Japanese Patent Application No. 2017-187742, filed Sep. 28, 2017. The contents of that application are herein incorporated by reference in their entirety.

BACKGROUND

Technical Field

The present disclosure relates to a dual-bearing reel for fishing.

Background Information

There exists a type of a dual-bearing reel that causes a level winder for guiding a fishing line to reciprocate in conjunction with the rotation of a spool. As this type of dual-bearing reel, Japanese Patent Application Laid-open No. 2016-067283 discloses a dual-bearing reel that has a first main body (a second cover 13, a side plate 17, a first rotation transmission mechanism 45, and the like) that rotatably supports one end of a spool and rotates the spool in response to the rotation of a handle, and a second main body (a first cover 11, a side plate 15, the first rotation transmission mechanism 45, and the like) that rotatably supports the other end of the spool and houses a gear (a gear portion 35d) that rotates in conjunction with the rotation of the spool. This dual-bearing reel further includes a worm shaft (a traverse cam shaft 35b) having the gear attached thereto and rotating together with the gear, a level wind pipe (a guide member 35c) having the worm shaft passing therethrough and having an outer diameter smaller than that of the gear, and a level winder (a fishing line guide 35a) that is reciprocated by the rotation of the worm shaft.

BRIEF SUMMARY

In the dual-bearing reel disclosed in Japanese Patent Application Laid-open No. 2016-067283, the diameter of an opening of the side plate 17, through which the level wind pipe passes, is approximately equal to the outer diameter of the level wind pipe. Therefore, when disassembling or assembling the dual-bearing reel for the purpose of maintenance or the like, the gear housed in the second main body cannot be taken in and out of the second main body (i.e., removing the gear from the second main body or placing the gear in the second main body) at the first main body side. However, in some cases the gear needs to be taken in or out at the first main body side, depending on the circumstances such as the design. Considering that the gear needs to be taken in and out, the structure of the second main body needs to be changed, while keeping the sealability of the part housing the gear (a gear housing portion).

The present disclosure was contrived in view of the foregoing circumstances, and it is an object of the present disclosure to provide a dual-bearing reel that is designed to move a level winder in conjunction with the rotation of a spool, and yet is capable of not only allowing a gear provided at one end of a worm shaft to be taken in and out at a first main body side but also ensuring the sealability of a gear housing portion.

In order to achieve the foregoing object, a dual-bearing reel according to the present disclosure is a dual-bearing reel (e.g., a dual-bearing reel 100) having a level winding mechanism, the dual-bearing reel including:

a first main body (e.g., a first main body 110) that rotatably supports one end of a spool (e.g., a spool 130) and rotates the spool in response to rotation of a handle (e.g., a handle 140);

a second main body (e.g., a second main body 120) that rotatably supports the other end of the spool, the second main body having a gear (e.g., a worm shaft gear 124) that rotates in conjunction with rotation of the spool;

a worm shaft (e.g., a worm shaft 151) that has the gear attached thereto and rotates together with the gear;

a level wind pipe (e.g., a level wind pipe 152 or a level wind pipe 181A) through which the worm shaft passes, the level wind pipe having an outer diameter smaller than an outer diameter of the gear; and a level winder (e.g., a level winder 153) that is reciprocated by rotation of the worm shaft, wherein the second main body includes a gear housing portion (e.g., a second housing portion 125B) for housing the gear, the gear housing portion having an opening (e.g., a first opening 125BA) that is larger than the gear to allow the level wind pipe to enter the opening, and the dual-bearing reel further including a gap filling portion (e.g., a gap filling portion 154 or a gap filling portion 181B) that fills a gap between the level wind pipe and an inner wall surface of the opening.

According to the foregoing configuration, because the opening of the gear housing portion is larger than the gear, the gear can be taken in and out through the opening of the gear housing portion (the second main body). Since the level wind pipe enters the opening, the opening is provided on the first main body side. Therefore, according to the foregoing configuration, the gear can be taken in and out of the second main body at the first main body side. In addition, providing the gap filling portion between the opening and the level wind pipe can ensure sealability of the gear housing portion.

The gap filling portion can be a hollow member (e.g., the gap filling portion 154) that is separate from the level wind pipe.

According to this configuration, the level wind pipe and the gap filling portion can be manufactured separately.

The gap filling portion can be famed integrally with the level wind pipe (e.g., the level wind pipe 181A and the gap filling portion 181B of a pipe-like member 181).

Such configuration can result in reduction in the number of parts.

A portion of the gear housing portion on the side opposite to the opening can be closed.

According to this configuration, a detachable cover member does not need to be provided on the opposite side of the opening.

The second main body can further include one or more gears (e.g., a first gear 121, a second gear 122, and a third gear 123) that transmit the rotation of the spool to the gear and a support housing portion (e.g., a first housing portion 125A) that rotatably supports the other end of the spool and that houses the one or more gears, and the gear housing portion can be smaller than the support housing portion and can have a shape that protrudes from the support housing portion.

Such configuration can result in reduction of the size of the entire second main body.

The present disclosure can provide a dual-bearing reel that is designed to move a level winder in conjunction with the rotation of a spool, and yet is capable of not only allowing a gear provided at one end of a worm shaft to be taken in and out at a first main body side but also ensuring the sealability of a gear housing portion.

DETAILED DESCRIPTION OF EMBODIMENTS

Embodiment 1

(Configuration of Dual-Bearing Reel 100)

The dual-bearing reel 100 for fishing according to Embodiment 1 of the present disclosure is described hereinafter with reference to the drawings. In the following descriptions, in a state in which the dual-bearing reel 100 is attached to a fishing rod, the direction toward the fishing rod is referred to as the "lower side" and the direction toward the other side is referred to as the "upper side."

Figure 1:
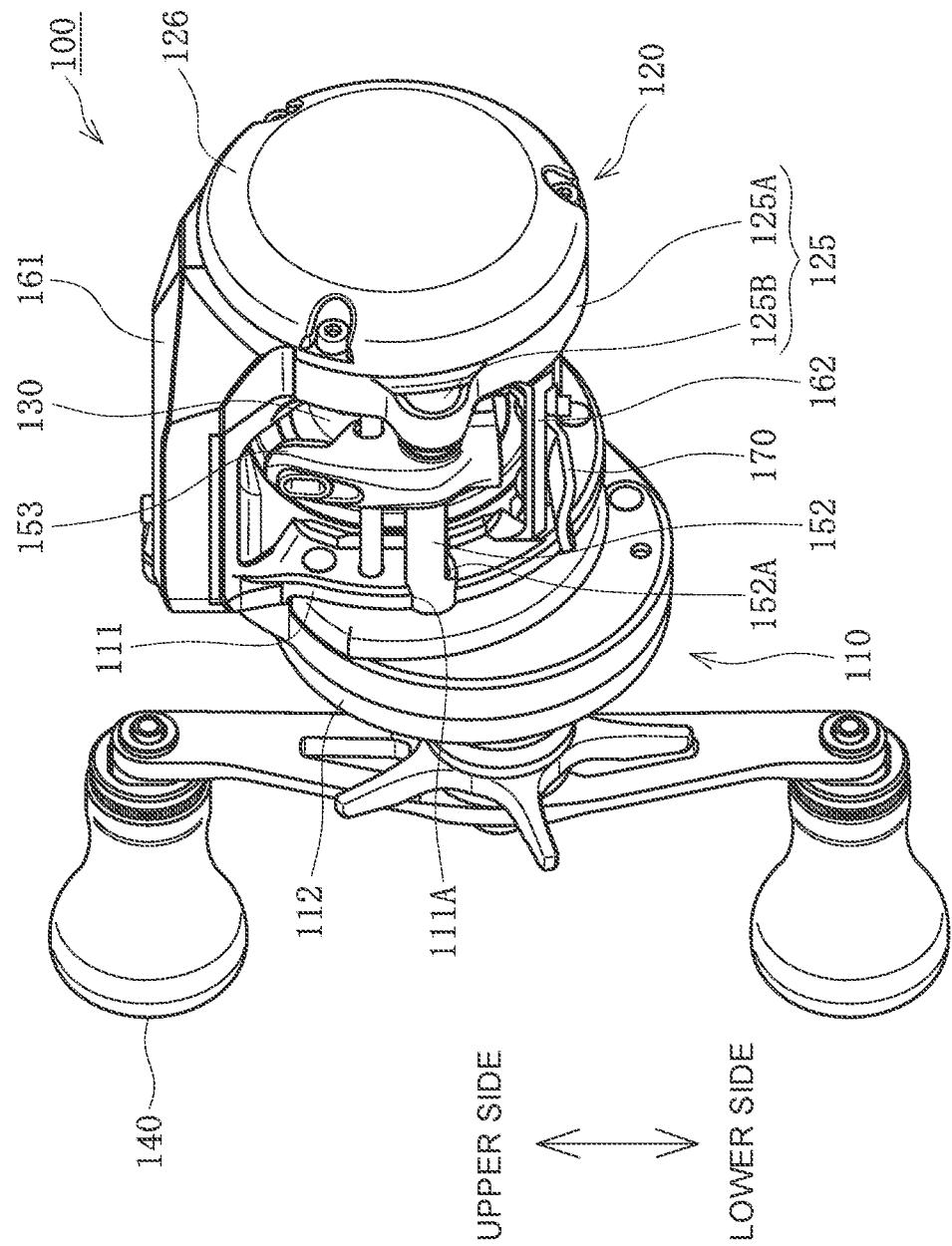
FIG. 1 is a perspective view of a dual-bearing reel according to Embodiment 1 of the present disclosure.
Figure 2:
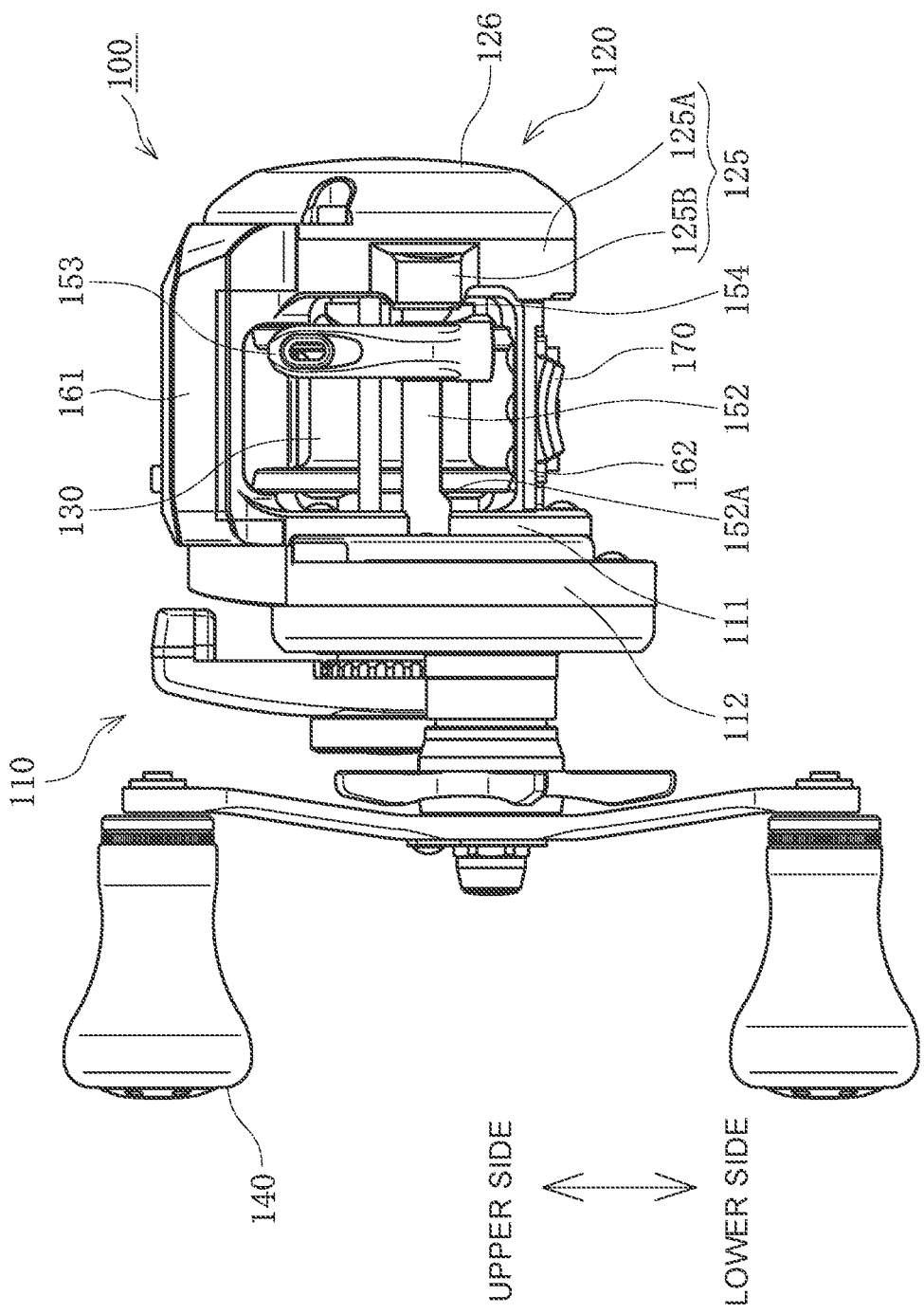
FIG. 2 is a front view of the dual-bearing reel according to Embodiment 1 of the present disclosure.
Figure 3:
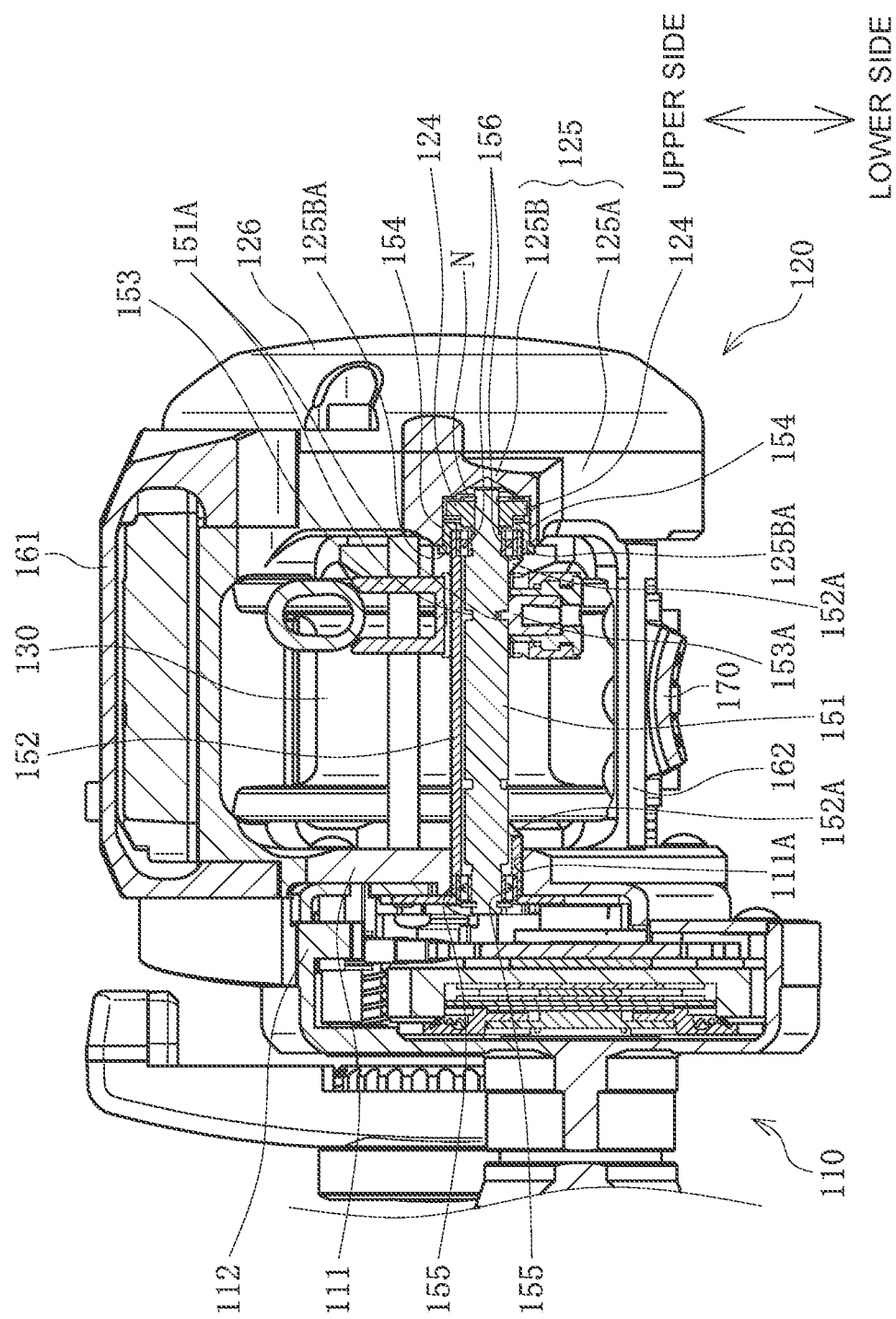
FIG. 3 is a cross-sectional view of the dual-bearing reel according to Embodiment 1 of the present disclosure.

As shown in FIGS. 1 to 3, the dual-bearing reel 100 has the first main body 110, the second main body 120, the spool 130, the handle 140, the worm shaft 151, the level wind pipe 152, the level winder 153, the gap filling portion 154, the first ball bearing 155, a second ball bearing 156, a first coupling 161, a second coupling 162, and a reel foot 170. The dual-bearing reel 100 is attached to the fishing rod by the reel foot 170.

The first main body 110 rotatably supports one end of the spool 130. The handle 140 is attached to the first main body 110. The first main body 110 has, on the inside thereof, a rotation mechanism (not shown) that rotates the spool 130 in response to the rotation of the handle 140. This rotation mechanism is constituted by, for example, a handle shaft that rotates together with the handle 140, and a plurality of gears that transmit the rotational force of the handle shaft. The first main body 110 also has a clutch mechanism, a mechanical brake, a drag mechanism, and the like.

The first main body 110 further has a disc-shaped first casing member 111 and a first cover 112 attached to the first casing member 111. A casing of the first main body 110 that houses the rotation mechanism and the like is constituted by the first casing member 111 and the first cover 112. The first casing member 111 has a notch 111A that supports one end of the level wind pipe 152.

The second main body 120 rotatably supports the other end of the spool 130. Therefore, the first main body 110 and the second main body 120 are arranged apart from each other with the spool 130 therebetween. The first main body 110 and the second main body 120 are coupled to each other by the first coupling 161 and the second coupling 162. In the first coupling 161, a water depth counter or the like for indicating the length of a fishing line that is fed out is mounted.

Figure 4:
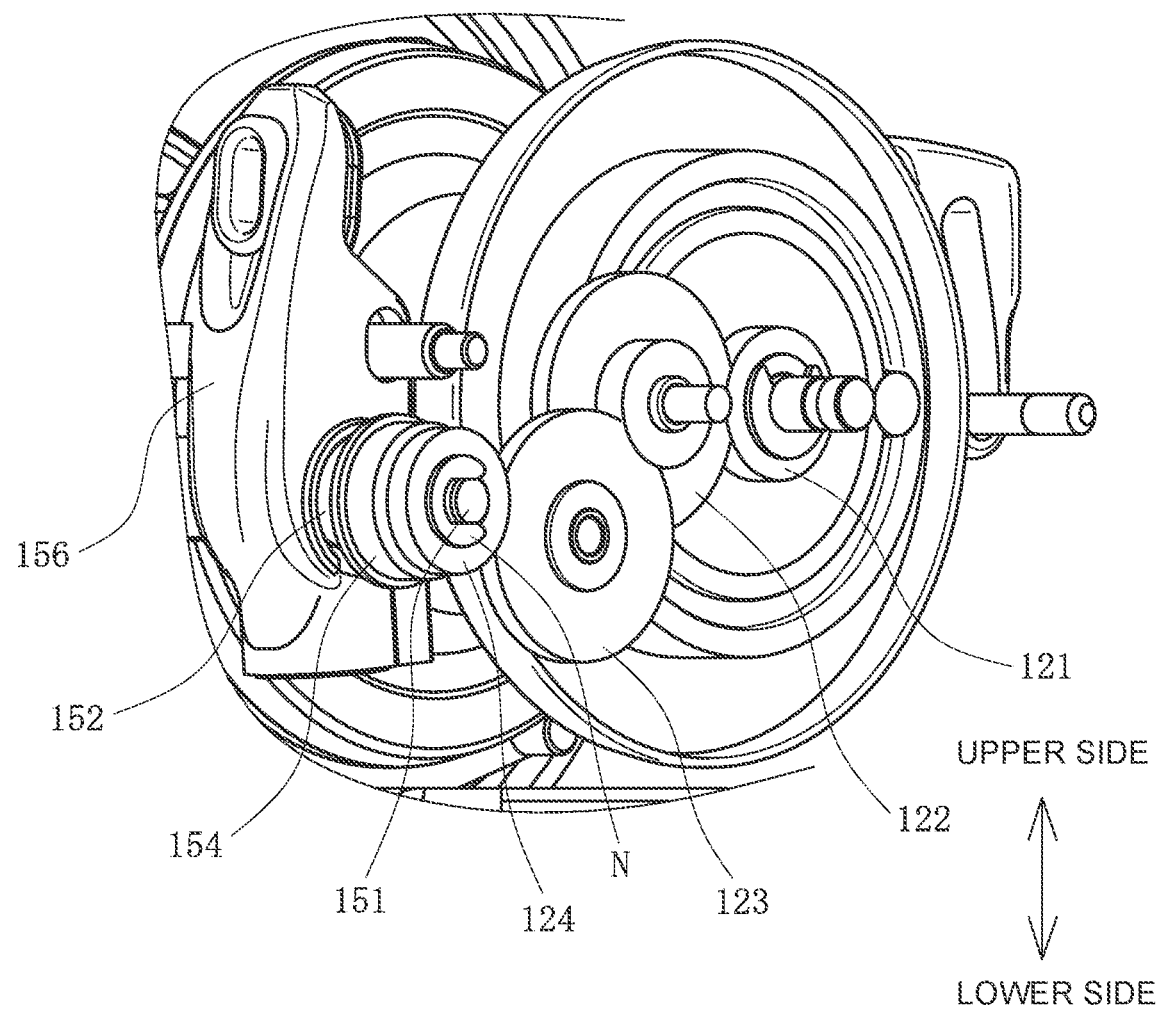
FIG. 4 is a perspective view showing an internal structure of a second main body of the dual-bearing reel according to Embodiment 1 of the present disclosure.

As shown in FIG. 4, the second main body 120 includes the first gear 121, the second gear 122, the third gear 123, and the worm shaft gear 124. These components constitute a rotation transmission mechanism for transmitting the rotation of the spool 130 to the worm shaft 151. In FIG. 4, each of the gears is shown in the shape of a disc and the illustration of indentations between teeth is omitted. In FIG. 4, parts that bite into each other between the gears indicate that the teeth of the gears are in mesh with each other.

The first gear 121 is attached to the spool 130 (e.g., a spool shaft) and rotates together with the spool 130. The second gear 122 has a large-diameter gear and a small-diameter gear, wherein the large-diameter gear is in mesh with the first gear 121. The third gear 123 is in mesh with the small-diameter gear of the second gear 122. The worm shaft gear 124 is in mesh with the third gear 123. The worm shaft gear 124 is attached to one end of the worm shaft 151 and rotates together with the worm shaft 151. Note that the worm shaft gear 124 is retained onto the worm shaft 151 by a retainer N. The first gear 121, the second gear 122, and the third gear 123 transmit the rotation of the spool 130 to the worm shaft gear 124. As a result of this transmission, the worm shaft gear 124 rotates and consequently the worm shaft 151 rotates as well.

In addition, as shown in FIGS. 1 to 3, the second main body 120 has a second casing member 125 and a second cover 126. The second casing member 125 has a first housing portion 125A and a second housing portion 125B. The first housing portion 125A and the second housing portion 125B are famed integrally.

The first housing portion 125A is a support housing portion that rotatably supports the spool 130 by means of a ball bearing or the like, which is not shown, has a cylindrical side wall, and houses the first gear 121, the second gear 122, and the third gear 123. The second cover 126 is attached to the first housing portion 125A. The second cover 126 is in the shape of a dome and covers the inside of the first housing portion 125A. The first housing portion 125A and the second cover 126 constitute a casing to house other parts (such as a battery case for housing a battery of the water depth counter) in addition to the first gear 121, the second gear 122, and the third gear 123.

Figure 5:
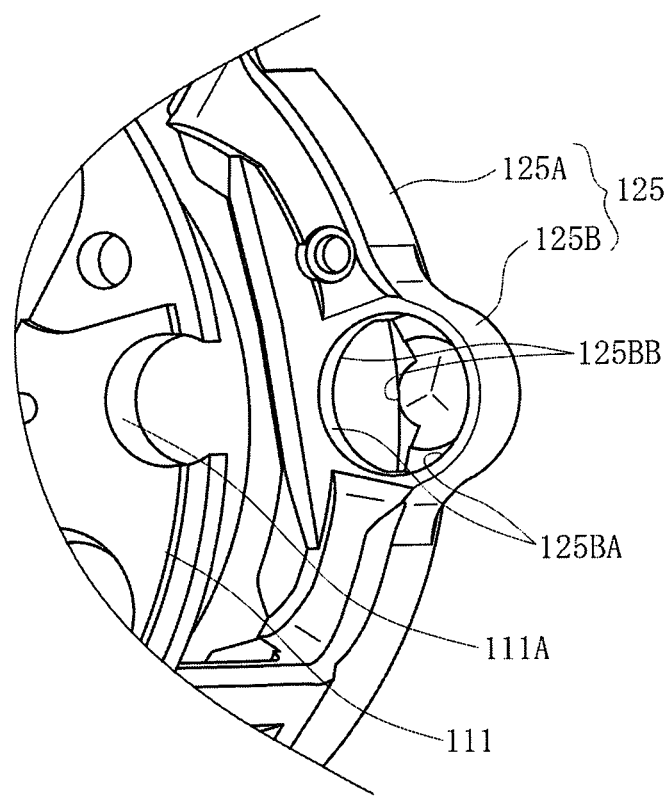
FIG. 5 is a perspective view showing a second housing portion of the second main body of the dual-bearing reel according to Embodiment 1 of the present disclosure.

As shown in FIG. 5, the second housing portion 125B is smaller than the first housing portion 125A and protrudes from a side surface of the first housing portion 125A (also see FIGS. 1 to 3). The second housing portion 125B has the first opening 125BA in the direction toward the first main body 110 and has a circular second opening 125BB in the direction toward the first housing portion 125A. As shown in FIG. 3, the second housing portion 125B is a gear housing portion for housing the worm shaft gear 124 therein. The first opening 125BA is designed to have an inner diameter larger than an outer diameter of the worm shaft gear 124. The interior of the first housing portion 125A and the interior of the second housing portion 125B are communicated with each other by the second opening 125BB, and the worm shaft gear 124 is in mesh with the third gear 123 via the second opening 125BB. Note that the second casing member 125 is integrally famed with a lower portion of the first coupling portion 161 and the first casing member 111 of the first main body 110, and FIG. 5 shows the first casing member 111 as well.

The worm shaft 151 has a substantially cylindrical shape and includes, on an outer peripheral surface thereof, a spiral groove 151A configured by two helical grooves. These two helical grooves are located over the entire outer peripheral surface of the worm shaft 151 and intersect with each other (also called "reciprocating spiral grooves" or the like). Although FIG. 3 shows only four spiral grooves 151A, i.e., two in an upper part and two in a lower part, the spiral grooves 151A are in fact famed over the entire surface of the outer periphery of the worm shaft 151. The worm shaft 151 is also called "cross gear" or the like. The first ball bearing 155 is attached to the one end of the worm shaft 151, and the second ball bearing 156 and the worm shaft gear 124 are attached to the other end of the worm shaft 151. Note that two washers W (see FIG. 7) are interposed between the second ball bearing 156 and the worm shaft gear 124 to prevent the second ball bearing 156 and the worm shaft gear 124 from wobbling.

The level wind pipe 152 has one end supported by the first main body 110 (the notch 111A) and the other end supported by the second main body 120 (the first opening 125BA, as described hereinafter in detail). The level wind pipe 152 is a tubular (pipe-like) member and has the worm shaft 151 passing therethrough. The first ball bearing 155 and the second ball bearing 156 that are attached to the worm shaft 151 are fitted in inner walls at both ends of the level wind pipe 152. Therefore, the worm shaft 151 is rotatable with respect to the level wind pipe 152. A rotation axis of the worm shaft 151 coincides with a central axis of the level wind pipe 152 and is parallel to a rotating shaft of the spool 130.

The outer diameter of the level wind pipe 152 is smaller than the outer diameter of the worm shaft gear 124 and the first opening 125BA. The other end of the level wind pipe 152 is disposed inside of the first opening 125BA with a gap between an outer peripheral surface of the level wind pipe 152 and an inner surface of the first opening 125BA. The level wind pipe 152 has, in a lower portion thereof, a window 152A for enabling a pin 153A of the level winder 153 to reach the spiral groove 151A of the worm shaft 151, the pin 153A being described hereinafter.

The level winder 153 is a guide tool for evenly winding the fishing line on the entire spool 130. The level wind pipe 152 and the worm shaft 151 pass through the level winder 153. The level winder 153 has the pin 153A inside. The pin 153A is disposed in the window 152A of the level wind pipe 152, and a tip of the pin 153A reaches the inside of the spiral groove 151A of the worm shaft 151.

Figure 6:
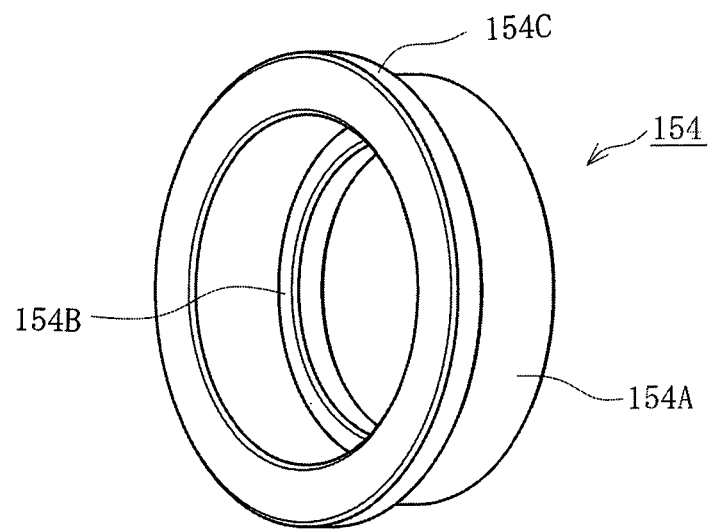
FIG. 6 is a perspective view of a gap filling portion of the dual-bearing reel according to Embodiment 1 of the present disclosure.

The gap filling portion 154 is a tubular hollow member that covers the end of the level wind pipe 152 at the second main body 120 side and fills the gap between the level wind pipe 152 and an inner wall surface of the first opening 125BA. As shown in FIG. 6, the gap filling portion 154 has a cylindrical portion 154A, a first flange 154B bulging inward from one end of the cylindrical portion 154A, and a second flange 154C bulging outward from the other end of the cylindrical portion 154A. A part of the cylindrical portion 154A is interposed between the level wind pipe 152 and the inner wall surface of the first opening 125BA, thereby filling the abovementioned gap.

Figure 7:
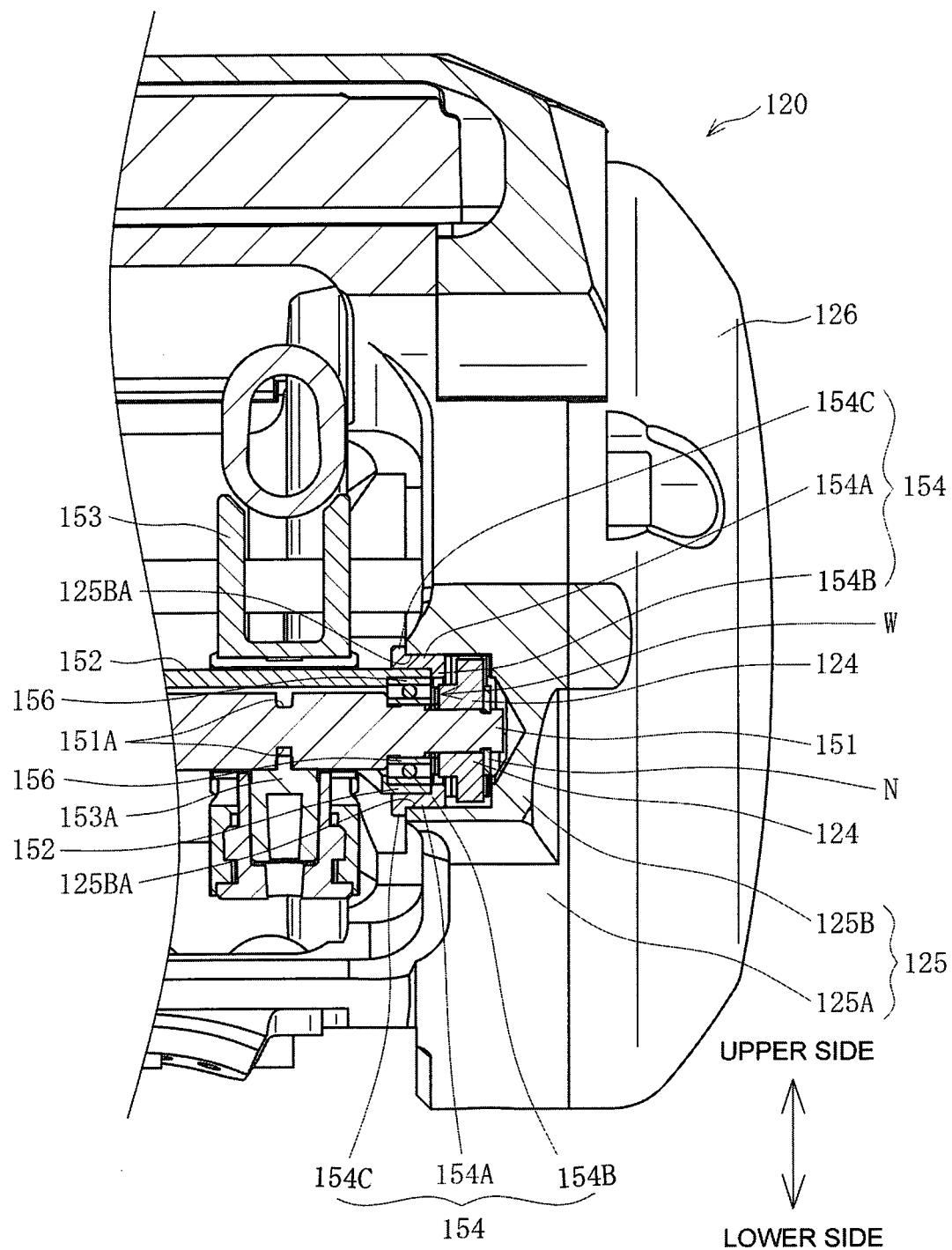
FIG. 7 is an enlarged cross-sectional view showing the vicinity of a housing portion of the second main body of the dual-bearing reel according to Embodiment 1 of the present disclosure.

As shown in FIG. 7, the outer diameter of the second flange 154C is larger than the first opening 125BA. Therefore, the gap filling portion 154 does not enter further inside the second housing portion 125B (on the right-hand side in the drawing) beyond the position of the gap filling portion 154 shown in FIG. 7. The outer diameter of the level wind pipe 152, on the other hand, is larger than the inner diameter of the first flange 154B of the gap filling portion 154. Therefore, the level wind pipe 152 does not enter further inside the second housing portion 125B beyond the position of the level wind pipe 152 shown in FIG. 7. The gap filling portion 154 also functions to determine the position of the level wind pipe 152, so the other end of the level wind pipe 152 is supported by the second main body 120 (the second housing portion 125B) via the gap filling portion 154. Thus, the gap filling portion 154 is an example of a means for determining the position of the level wind pipe 152.

(Operations of Dual-Bearing Reel 100)

Operations of the dual-bearing reel 100 are described next. When a user performs an operation of rotating the handle 140 of the dual-bearing reel 100, the spool 130 rotates in response to this rotation operation. As the spool 130 rotates, the first gear 121, the second gear 122, and the third gear 123 rotate in conjunction therewith, and the worm shaft gear 124 in mesh with the third gear 123 rotates as well. The rotation of the worm shaft gear 124 causes the worm shaft 151 to rotate.

When the worm shaft 151 rotates, the pin 153A of the level winder 153 disposed in the spiral groove 151A is guided by the spiral groove 151A and reciprocated on the worm shaft 151. As a result, the level winder 153 reciprocates in the direction of the rotation axis of the worm shaft 151 and the direction of the central axis of the level wind pipe 152.

These operations are summarized as follows. When the user performs the operation of rotating the handle 140, the spool 130 rotates, and the fishing line guided by the level winder 153 is wound on the spool 130. At this moment, the level winder 153 moves along the rotation axis of the worm shaft 151, changing the position on which the fishing line is wound. Thus, this simple operation of rotating the handle 140 performed by the user can evenly wind the fishing line on an outer periphery of the spool 130.

In this manner, the worm shaft gear 124, the worm shaft 151, the level wind pipe 152, and the level winder 153 work together to function as a level winding mechanism for guiding the fishing line. Furthermore, this level winding mechanism is a spool linked-type level winding mechanism in which the level winder 153 moves in conjunction with the rotation of the spool 130.

(Disassembly and the Like of Level Winding Mechanism)

Users can disassemble and assemble the level winding mechanism for the purpose of maintenance, part replacement, and the like. A method in which users can disassemble the level winding mechanism is now described hereinafter. The level winding mechanism can be assembled by performing the procedure of the following method backwards. Note that, in the following description, the group of the worm shaft 151, the level wind pipe 152, the gap filling portion 154, the first ball bearing 155, the second ball bearing 156, and the retainer N is referred to as "unit A."

First, a user removes the first cover 112 of the first main body 110 from the first casing member 111, to remove the rotation mechanism and the like from the inside. Then, the user pulls out the unit A, with the level winder 153 attached thereto, until a tip of the unit A at the first main body 110 side moves to the vicinity of the middle between the first main body 110 and the second main body 120 in the direction of the first main body 110 (the left-hand side of FIG. 7). In so doing, the level wind pipe 152 moves while sliding with respect to an inner wall of the notch 111A of the first casing member 111. Moreover, at this moment, the worm shaft gear 124 and the like are removed from the second housing portion 125B through the first opening 125BA. Thus, the first opening 125BA is an example of a means for removing the worm shaft gear 124 from the second housing portion 125B of the second main body 120. Such removal is possible because the first opening 125BA is larger than the worm shaft gear 124. Thereafter, the user removes, from the worm shaft 151, the worm shaft gear 124, the gap filling portion 154, and the retainer N that are contained in the unit A. Subsequently, the user removes the level winder 153 and pulls out the level wind pipe 152 from the first casing member 111 (notch 111A). In so doing, the worm shaft 151, the first ball bearing 155, and the second ball bearing 156 are pulled out together as well. The level winding mechanism can be disassembled in this manner.

Effects of Embodiment 1

According to Embodiment 1, the level winding mechanism can allow the level winder 153 to move in conjunction with the rotation of the spool 130. Also, because the first opening 125BA is larger than the worm shaft gear 124, the worm shaft gear 124 that is attached to the worm shaft 151 can be taken in and out of the second main body 120 (especially the first housing portion 125B), at the first main body 110 side via the first opening 125BA. In addition, the sealability of the second housing portion 125B can be ensured by the gap filling portion 154. Furthermore, the disassembly method described above can allow the user to disassemble or assemble the level winding mechanism without disassembling the second main body 120.

Moreover, by configuring the gap filling portion 154 as a hollow member separate from the level wind pipe 152, the level wind pipe 152 and the gap filling portion 154 can be manufactured separately. Accordingly, for example, only the gap filling portion 154 can be replaced, while leaving the level wind pipe 152 as it is. The gap filling portion 154 can also be used as a member for determining the position of the level wind pipe 152, as described above.

In Embodiment 1, the outer shape of the second main body 120 is configured such that the second housing portion 125B protrudes from the first housing portion 125A, whereby the entire second main body 120 is small. The fact that the entire second main body 120 is small provides an advantage that, for example, allows the user to palm the dual-bearing reel 100.

Also, in Embodiment 1, the second housing portion 125B is in the shape of a bag and the portion of the second housing portion 125B on the side opposite to the first opening 125BA is closed. This eliminates the need to provide an opening at this portion of the second housing portion 125B on the side opposite to the first opening 125BA, thereby ensuring the sealability of the second housing portion 125B. Note that the removal of the worm shaft gear 124 can be ensured by the first opening 125BA.

According to the configuration of Embodiment 1, the first gear 121, the second gear 122, and the third gear 123 can be taken in and out at the second cover 126 side, but in some cases the worm shaft gear 124, too, is taken in and out at the second cover 126 side (the side opposite to the first opening 125BA) (the spool linked-type level winding mechanism usually has this type of configuration). In such a case, however, the second cover 126 needs to have a shape corresponding to the first housing portion 125A and the second housing portion 125B. The first housing portion 125A and the second housing portion 125B have, as a whole, a complicated shape due to the protruding shape of the second housing portion 125B. Therefore, the shape of the second cover 126 becomes complicated as well. In such a case, it is difficult to form the second cover 126 accurately so as to be joined to the whole first and second housing portions 125A and 125B. In Embodiment 1, such disadvantage does not occur because the portion of the second housing portion 125B on the side opposite to the first opening 125BA is closed, and installation and removal of the worm shaft 124 can be ensured by the first opening 125BA.

Embodiment 2

According to Embodiment 1, the gap filling portion 154 is illustrated as a hollow member separate from the level wind pipe 152. In Embodiment 2, the gap filling portion is famed integrally with the level wind pipe. Note that the present embodiment mainly describes the differences from Embodiment 1.

Figure 8:
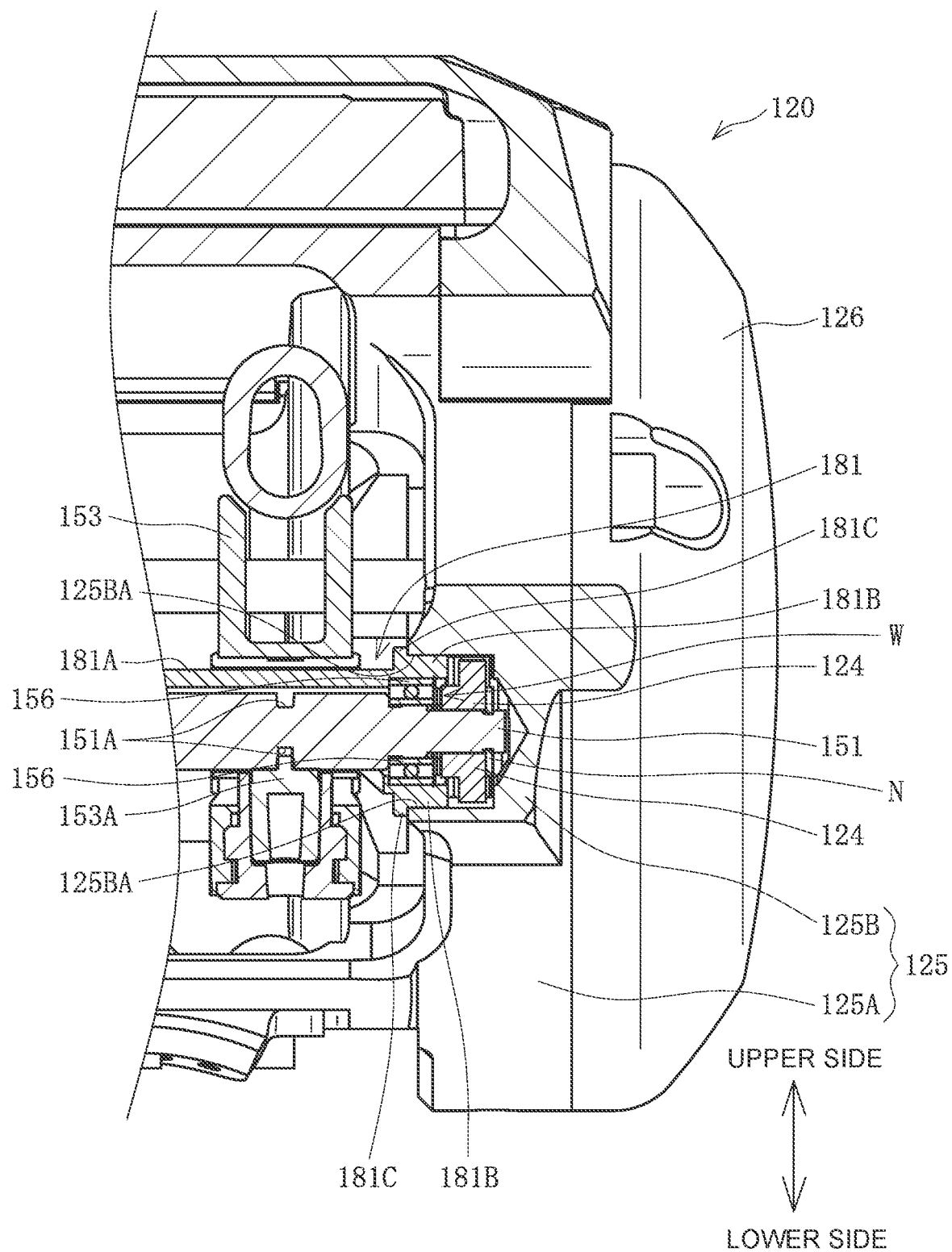
FIG. 8 is an enlarged cross-sectional view showing the vicinity of the housing portion of the second main body of the dual-bearing reel according to Embodiment 2 of the present disclosure.

As shown in FIG. 8, in place of the level wind pipe 152 and the gap filling portion 154, Embodiment 2 has a pipe-like member 181 in which the level wind pipe 152 and the gap filling portion 154 are integrated. The pipe-like member 181 has a tubular level wind pipe 181A corresponding to the level wind pipe 152 and a tubular gap filling portion 181B corresponding to the gap filling portion 154. The gap filling portion 181B of the pipe-like member 181 shown in FIG. 8, too, has a flange 181C. Therefore, the level wind pipe 181A does not enter further inside the second housing portion 125B beyond the position of the level wind pipe 181A shown in FIG. 8 (on the right-hand side in the drawing). Note that the other configurations are the same as those described in Embodiment 1, and therefore the description thereof is omitted herein.

In the present embodiment, the portion corresponding to the gap filling portion 154 of Embodiment 1 is famed integrally with the level wind pipe 181A. Therefore, the object of the present disclosure can be achieved with a small number of parts.

Modification

The present disclosure is not limited to the foregoing embodiments, and therefore various changes can be made to the present disclosure. For example, the second housing portion 125B of the dual-bearing reel 100 of the foregoing embodiments protrudes from the first housing portion 125A. However, the scope of the present disclosure is not limited to this configuration, and the first gear 121, the second gear 122, the third gear 123, and the worm shaft gear 124 can be housed in, for example, a cylindrical housing portion. The present disclosure can be applied to the second housing portion 125B and the second casing member 125 of various shapes. The first casing member 111 of the first main body 110 and the second casing member 125 of the second main body 120 can be provided as separate members. The first housing portion 125A and the second housing portion 125B each can be constituted by a plurality of parts.

The portion of the second housing portion 125B of the dual-bearing reel 100 of the foregoing embodiments, which is on the side opposite to the first opening 125BA, is closed. More specifically, unlike the first housing portion 125A, the second housing portion 125B does not have an opening at the portion thereof on the side opposite to the first opening 125BA, and a cover is not used on the portion. However, the scope of the present disclosure is not limited to this configuration, and the portion on the side opposite to the first opening 125BA also can be opened (in this case, this opening is covered with a cover).

The level wind pipe 152 (or the level wind pipe 181A, and the same is true on Modification) passes through the level winder 153 of the dual-bearing reel 100 of the foregoing embodiments. However, the scope of the present disclosure is not limited to this configuration, and it is sufficient that the pin 153A of the level winder 153 can be disposed in the spiral groove 151A of the worm shaft 151. The present disclosure can adopt a configuration in which a notch is provided on the level winder 153 and the level wind pipe 152 passes through this notch. The present disclosure is applicable to the level winder 153 of various shapes.

The level wind pipe 152 of the dual-bearing reel 100 of the foregoing embodiments has the window 152A. The window 152A can be of any size or shape. The window 152A can be enlarged, and the cross section of the level wind pipe 152 can have a semicircular shape. Such a level wind pipe 152, too, is categorized as a tubular shape. In this case, the size of the diameter of the level wind pipe 152 indicates the size that can be estimated from the shape of the level wind pipe 152 without the window 152A.

The shape of the first opening 125BA of the second housing portion 125B is not limited to a circular shape and therefore can be a square shape or the like.

EXPLANATION OF REFERENCE NUMERALS

100 Dual-bearing reel
110 First main body
111 First casing member
111A Notch
112 First cover
120 Second main body
121 First gear
122 Second gear
123 Third gear
124 Worm shaft gear
125 Second casing member
125A First housing portion
125B Second housing portion
125BA First opening
125BB Second opening
126 Second cover
130 Spool
140 Handle
151 Worm shaft
151A Spiral groove
152, 181A Level wind pipe
152A Window
153 Level winder
153A Pin
154, 181B Gap filling portion
154A Cylindrical portion
154B, 181C First flange
154C Second flange
155 First ball bearing
156 Second ball bearing
161 First coupling
162 Second coupling
170 Reel foot
181 Pipe-like member

What is claimed is:

1. A dual-bearing reel having a level winding mechanism, the dual-bearing reel comprising:
    a first main body that rotatably supports one end of a spool and rotates the spool in response to rotation of a handle;
    a second main body that rotatably supports the other end of the spool, the second main body including a gear that rotates in conjunction with rotation of the spool;
    a worm shaft that has the gear attached thereto and rotates together with the gear;
    a level wind pipe through which the worm shaft passes, the level wind pipe having an outer diameter smaller than an outer diameter of the gear; and
    a level winder that is reciprocated by rotation of the worm shaft,
    wherein the second main body includes a gear housing portion for housing the gear,
    the gear housing portion having an opening that is larger than the gear to allow the level wind pipe to enter the opening, and
    the dual-bearing reel further comprises a gap filling portion that fills a gap between the level wind pipe and an inner wall surface of the opening.

2. The dual-bearing reel according to claim 1, wherein the gap filling portion is a hollow member that is separate from the level wind pipe.

3. The dual-bearing reel according to claim 1, wherein the gap filling portion is integral with the level wind pipe.

4. The dual-bearing reel according to claim 1, wherein a portion of the gear housing portion on a side opposite to the opening is closed.

5. The dual-bearing reel according to claim 4, wherein the second main body further includes one or more gears that transmit the rotation of the spool to the gear and a support housing portion that rotatably supports the other end of the spool and that houses the one or more gears, and
the gear housing portion is smaller than the support housing portion and has a shape that protrudes from the support housing portion.

6. The dual-bearing reel according to claim 1, wherein the second main body further includes one or more gears that transmit the rotation of the spool to the gear and a support housing portion that rotatably supports the other end of the spool and that houses the one or more gears, and
the gear housing portion is smaller than the support housing portion and has a shape that protrudes from the support housing portion.

* * * * *